US008077701B2

(12) United States Patent
Ku et al.

(10) Patent No.: US 8,077,701 B2
(45) Date of Patent: Dec. 13, 2011

(54) SYSTEMS, METHODS, AND APPARATUS TO PRIORITIZE COMMUNICATIONS IN IP MULTIMEDIA SUBSYSTEM NETWORKS

(75) Inventors: Bernard Ku, Austin, TX (US); Mehrad Yasrebi, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1234 days.

(21) Appl. No.: 11/458,878

(22) Filed: Jul. 20, 2006

(65) Prior Publication Data

US 2008/0019267 A1  Jan. 24, 2008

(51) Int. Cl.
*H04L 12/66* (2006.01)

(52) U.S. Cl. ........................................ 370/352; 370/356

(58) Field of Classification Search .................. 370/352, 370/466, 471, 392, 220.01, 353; 709/204, 709/224, 227, 245–246, 206; 375/224
See application file for complete search history.

(56) References Cited

U.S. PATENT DOCUMENTS

| 5,161,180 | A | 11/1992 | Chavous |
| 5,347,568 | A | 9/1994 | Moody et al. |
| 5,479,482 | A | 12/1995 | Grimes |
| 6,415,019 | B1 | 7/2002 | Savaglio et al. |
| 6,650,901 | B1 | 11/2003 | Schuster et al. |
| 6,678,357 | B2 | 1/2004 | Stumer et al. |
| 6,707,888 | B1 | 3/2004 | Cope |
| 6,771,742 | B2 | 8/2004 | McCalmont et al. |
| 6,801,906 | B1 * | 10/2004 | Bates et al. ........................ 707/3 |
| 6,917,612 | B2 * | 7/2005 | Foti et al. ...................... 370/352 |
| 6,927,727 | B2 | 8/2005 | Cleghorn |
| 6,931,453 | B2 * | 8/2005 | Aarnos et al. ................. 709/245 |
| 6,940,950 | B2 | 9/2005 | Dickinson et al. |
| 7,027,564 | B2 | 4/2006 | James |
| 7,042,985 | B1 | 5/2006 | Wright |
| 7,079,627 | B2 | 7/2006 | Crago et al. |

(Continued)

FOREIGN PATENT DOCUMENTS

EP  1337089  8/2003

(Continued)

OTHER PUBLICATIONS

International Bureau, International Preliminary Report on Patentability for International application PCT/US2007/012395, Jan. 20, 2009, 6 pages.

(Continued)

*Primary Examiner* — Michael J Moore, Jr.
(74) *Attorney, Agent, or Firm* — Hanley, Flight & Zimmerman, LLC.

(57) ABSTRACT

Systems, methods and apparatus are disclosed to prioritize communications in Internet protocol Multimedia Subsystem (IMS) networks. An example method disclosed herein includes receiving a telephone number (TN), locating an ENUM database record for the TN specifying at least one non-IMS destination, receiving a plurality of current call parameters, and accessing a prioritization profile comprising a plurality of selection parameters. The example method further discloses evaluating at least one of the plurality of current call parameters based on the prioritization profile to select at least one of a plurality of non-SIP and non-TN URIs as a destination for the TN, and routing a communication session between the calling device and the selected URI. The plurality of non-SIP and non-TN URIs including at least one of an e-mail URI, an instant message URI, a fax URI, or a web URI.

50 Claims, 7 Drawing Sheets

U.S. PATENT DOCUMENTS

| | | | |
|---|---|---|---|
| 7,103,034 B1 | 9/2006 | Srinivas et al. | |
| 7,130,385 B1 | 10/2006 | Moon | |
| 7,184,527 B1* | 2/2007 | Lin et al. | 379/93.17 |
| 7,260,186 B2 | 8/2007 | Zhu et al. | |
| 7,360,210 B1* | 4/2008 | Vacanti et al. | 717/171 |
| 7,480,933 B2 | 1/2009 | Bush et al. | |
| 7,639,792 B2 | 12/2009 | Qiu et al. | |
| 7,644,181 B2* | 1/2010 | Plata et al. | 709/239 |
| 2001/0022558 A1 | 9/2001 | Karr, Jr. et al. | |
| 2002/0024943 A1 | 2/2002 | Karaul et al. | |
| 2002/0147845 A1 | 10/2002 | Sanchez-Herrero et al. | |
| 2003/0146871 A1 | 8/2003 | Karr et al. | |
| 2003/0222819 A1 | 12/2003 | Karr et al. | |
| 2003/0222820 A1 | 12/2003 | Karr et al. | |
| 2004/0057425 A1 | 3/2004 | Brouwer et al. | |
| 2004/0057442 A1 | 3/2004 | Westman et al. | |
| 2004/0068584 A1* | 4/2004 | Costa-Requena et al. | 709/246 |
| 2004/0125923 A1 | 7/2004 | See et al. | |
| 2004/0151283 A1 | 8/2004 | Lazoff | |
| 2004/0198386 A1 | 10/2004 | Dupray | |
| 2004/0205241 A1 | 10/2004 | Aarnos | |
| 2004/0246965 A1* | 12/2004 | Westman et al. | 370/392 |
| 2004/0266457 A1 | 12/2004 | Dupray | |
| 2005/0026650 A1 | 2/2005 | Russell | |
| 2005/0027867 A1 | 2/2005 | Mueller et al. | |
| 2005/0063519 A1 | 3/2005 | James | |
| 2005/0090225 A1 | 4/2005 | Muehleisen et al. | |
| 2005/0135569 A1 | 6/2005 | Dickinson et al. | |
| 2005/0141431 A1 | 6/2005 | Caveney et al. | |
| 2005/0153681 A1 | 7/2005 | Hanson | |
| 2005/0175166 A1 | 8/2005 | Welenson et al. | |
| 2005/0190892 A1 | 9/2005 | Dawson et al. | |
| 2005/0207402 A1* | 9/2005 | Kobayashi et al. | 370/352 |
| 2005/0213716 A1 | 9/2005 | Zhu et al. | |
| 2005/0226174 A1 | 10/2005 | Kiss | |
| 2005/0232164 A1 | 10/2005 | Anzarouth et al. | |
| 2005/0249152 A1 | 11/2005 | Kiss et al. | |
| 2005/0265326 A1 | 12/2005 | Laliberte | |
| 2006/0039539 A1 | 2/2006 | Goldman et al. | |
| 2006/0056388 A1 | 3/2006 | Livingood | |
| 2006/0068753 A1 | 3/2006 | Karpen et al. | |
| 2006/0072553 A1* | 4/2006 | Miyajima et al. | 370/352 |
| 2006/0083222 A1* | 4/2006 | Miyajima et al. | 370/352 |
| 2006/0120517 A1 | 6/2006 | Moon et al. | |
| 2006/0140200 A1* | 6/2006 | Black et al. | 370/401 |
| 2006/0201622 A1 | 9/2006 | Sehr et al. | |
| 2006/0262917 A1* | 11/2006 | Marsico | 379/220.01 |
| 2007/0104183 A1 | 5/2007 | Bakke et al. | |
| 2007/0104184 A1* | 5/2007 | Ku et al. | 370/352 |
| 2007/0115935 A1 | 5/2007 | Qiu et al. | |
| 2007/0127452 A1 | 6/2007 | Croy | |
| 2007/0153777 A1* | 7/2007 | Coulas et al. | 370/356 |
| 2007/0201622 A1 | 8/2007 | Croak et al. | |
| 2007/0280213 A1 | 12/2007 | Sindhwani et al. | |
| 2008/0101552 A1 | 5/2008 | Khan et al. | |
| 2008/0125077 A1 | 5/2008 | Velazquez et al. | |
| 2008/0200143 A1 | 8/2008 | Qiu et al. | |
| 2009/0067411 A1* | 3/2009 | Heidermark et al. | 370/352 |

FOREIGN PATENT DOCUMENTS

| | | |
|---|---|---|
| EP | 1337089 A | 8/2003 |
| EP | 1337089 | 3/2004 |
| EP | 1589721 A | 10/2005 |
| WO | 2004061543 | 7/2004 |
| WO | WO 2005015870 A1 | 2/2005 |
| WO | 2005104518 | 11/2005 |
| WO | 2006023190 | 3/2006 |
| WO | WO 2007056186 | 5/2007 |

OTHER PUBLICATIONS

International Search Report for International application No. PCT/US2007/012395, 3 pages.

Written Opinion of the International Searching Authority for International application No. PCT/US2007/012395, 6 pages.

Patent Cooperation Treaty, "International Search Report," issued by the International Searching Authority in connection with related PCT application No. PCT/US2008/051141, mailed Mar. 27, 2009 (6 pages).

Patent Cooperation Treaty, "Written Opinion of the International Searching Authority," issued by the International Searching Authority in connection with related PCT application No. PCT/US2008/051141, mailed Mar. 27, 2009 (11 pages).

International Searching Authority, Invitation to Pay Additional Fees and Partial International Search for International application No.: PCT/US2008/051141, Jan. 27, 2009, 5 pages.

National Emergency Number Association (NENA) Technical Committee Chairs, Interim VoIP Architecture for Enhanced 9-1-1 Services (i2), NENA Template for Creating or Updating E9-1-1 Standards Documents, Issue 1 DRAFT, Aug. 5, 2005, 192 pages.

AT&T, AT&T Business Service Guide, AT&T Business Voice over IP (BVoIP) Services, Sep. 22, 2006, 40 pages.

Frost & Sullivan, U.S. E9-1-1 Market Insight 6847-63, www.frost.com, 2003, pages: all.

Chaoxin Qiu et al., A System and Method for Location Management and Emergency Support for a Voice over Internet Protocol Device, U.S. Appl. No. 11/286,495, filed Nov. 23, 2005.

Velasquez et al., Methods and Apparatus to Update Geographic Location Information Associated with Internet Protocol Devices for E-911 Services, U.S. Appl. No. 11/462,576, filed Aug. 4, 2006.

United States Patent and Trademark Office, office action issued for U.S. Appl. No. 11/676,877, dated Apr. 26, 2010, 11 pages.

United States Patent and Trademark Office, office action issued for U.S. Appl. No. 11/462,576, dated Dec. 7, 2007, 14 pages.

United States Patent and Trademark Office, office action issued for U.S. Appl. No. 11/462,576, dated Apr. 20, 2010, 10 pages.

European Patent Office, Communication issued in EP Application No. 07777260.6, dated Apr. 11, 2011, 5 pages.

* cited by examiner

US 8,077,701 B2

SYSTEMS, METHODS, AND APPARATUS TO PRIORITIZE COMMUNICATIONS IN IP MULTIMEDIA SUBSYSTEM NETWORKS

FIELD OF THE DISCLOSURE

This disclosure relates generally to interactive Internet protocol (IP) multimedia subsystem (IMS) networks, and, more particularly, to systems, methods, and apparatus to prioritize communications in IMS networks.

BACKGROUND

Voice over Internet Protocol (VoIP) telephony calls may be routed in an IMS network using a telephone number mapping (ENUM) database. FIG. 1 illustrates a flow diagram of routing a voice call in an IMS network using ENUM. A caller may place a call on their home network (HN) with caller user equipment (UE) and reach a callee of another HN on the callee's UE. Typically, the caller dials an E.164 number of the callee, which may be passed to a Proxy Call Session Control Function (P-CSCF) of the caller's HN. Based on the E.164 number, the P-CSCF sends an invite (Request URI) message and passes it to a Serving-CSCF (S-CSCF) of the caller's HN. The S-CSCF queries an ENUM database of the caller's HN in an attempt to resolve the E.164 number to a Uniform Resource Indicator (URI).

Typically, the ENUM database will return a Session Initiation Protocol (SIP) URI or a telephone (TEL) URI to the S-CSCF based on the query. Based on the SIP/TEL URI, the S-CSCF queries a Domain Name System (DNS) of the caller's HN to resolve a domain name of the URI to an Internet Protocol (IP) address. The DNS returns the IP address of the URI domain to the S-CSCF. The IP address is then passed to an Interrogating-CSCF (I-CSCF) of the callee's HN.

In a particular implementation, using the IP address, the caller's HN sends a SIP INVITE request to the callee's HN and passes the SIP INVITE request to the UE of the callee.

In some circumstances, the ENUM database may not return a SIP URI or a TEL URI in response to its being queried (e.g., the communication requested returns a URI unknown to the S-CSCF, thereby preventing call completion). In this case, the call is not routed using the IMS core, but rather via a public switched telephone network (PSTN). Furthermore, if an entry for the E.164 number is not in the ENUM database, the caller is commonly routed to an announcement which indicates an error condition.

In other circumstances, the non-SIP or non-TEL URIs returned by the ENUM database may be resolved by the caller's network. However, the caller typically makes alternate call completion decisions despite knowledge of whether such decisions will have a beneficial effect for the caller.

DETAILED DESCRIPTION

Systems, methods, and apparatus to prioritize communications in Internet protocol multimedia subsystem networks are disclosed. An example apparatus includes an interactive Internet protocol multimedia subsystem (IMS) and a processor to receive a telephone number (TN) from a calling device and locate a data record based on the TN, the data record including a plurality of non-session initiation protocol (SIP) and non-TN uniform resource identifiers (URIs). Additionally, the example processor receives a plurality of current call parameters, accesses a prioritization profile including a plurality of selection parameters, and evaluates at least one of the plurality of current call parameters based on the prioritization profile to select at least one of the plurality of non-SIP and non-TN URIs as a destination for the TN. The example processor routes a communication session between the calling device and the selected URI, in which the non-SIP and non-TN URIs include at least one of an e-mail URI, an instant message URI, a fax URI, or a web URI.

IMS Voice over IP (VoIP) employs SIP URIs for voice communications. Unfortunately, if neither a SIP URI nor a TEL URI is returned in response to an ENUM/DNS query (e.g., as a result of a callee's preferences and/or the ENUM processing), then conventional IMS call processing does not continue.

Unlike the example call described above, the systems, methods, and apparatuses described herein associate other URIs with the callee, such as e-mail, web pages, and/or instant messaging (IM) URIs. One or more of the other URIs may be selected by the caller and used to reach the callee with a specific service execution using a relevant protocol. As a result, processing a non-SIP and/or a non-TEL URI returned from an ENUM/DNS query enable a more robust deployment of VoIP services and improve overall caller and callee satisfaction.

Figure 1:
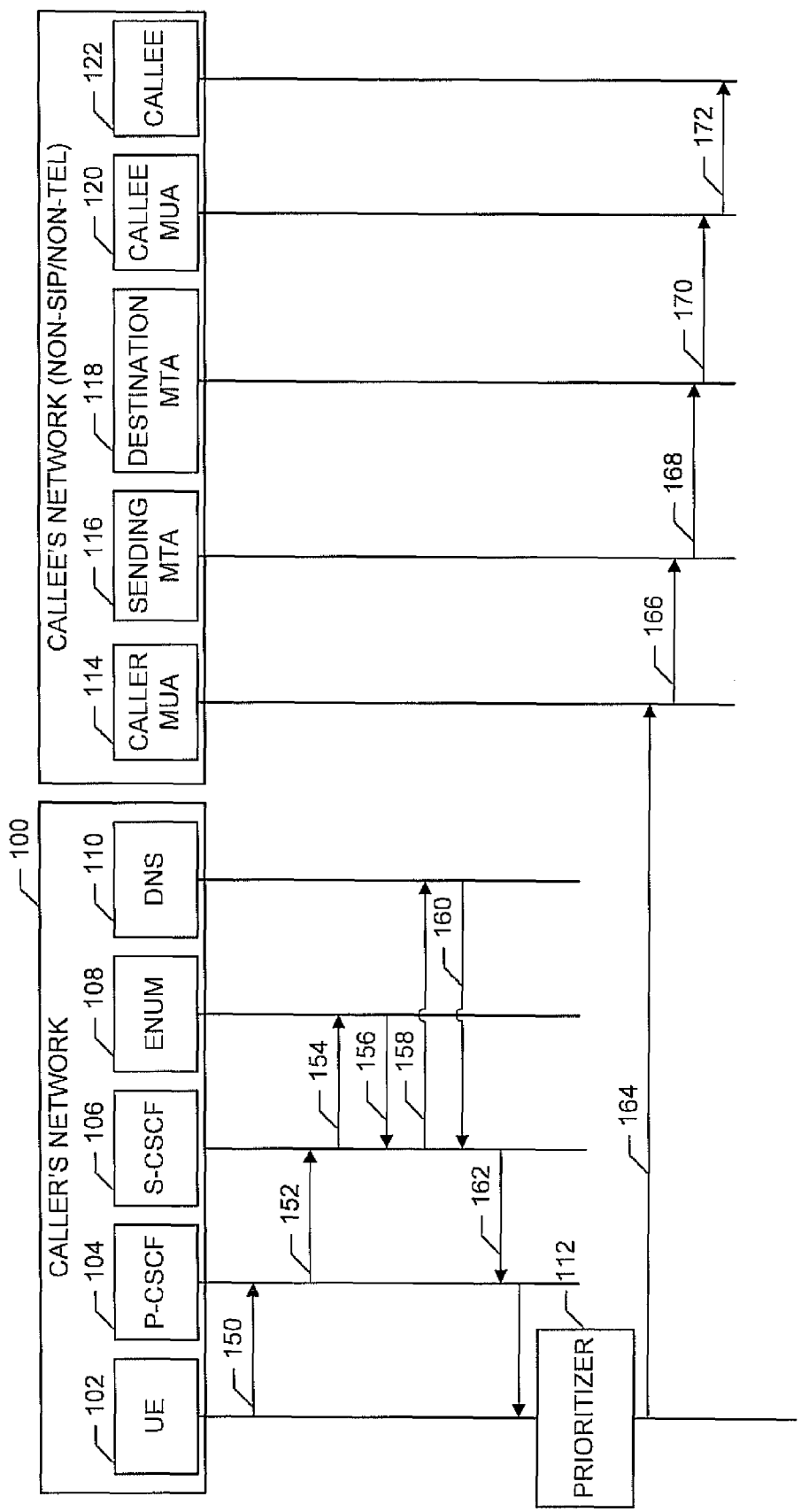
FIG. 1 is a flow diagram illustrating example routing of a non-SIP/non-TEL URI in an IMS.

FIG. 1 is an example flow diagram of routing a call to a callee when ENUM query from an IMS HN 100 returns a non-SIP/non-TEL URI. From user equipment (UE) 102, a caller may dial an E.164 number of a callee. At line 150, the E.164 number may be passed from the user equipment 102 to a Proxy Call Session Control Function (P-CSCF) 104 of the IMS HN 100. At line 152, based on the E.164 number, the P-CSCF 104 may send an invite (Request URI) message and pass it to a Serving-CSCF (S-CSCF) 106 of the IMS HN 100. The S-CSCF 106 may query an ENUM database 108 of the IMS HN 100 to attempt to resolve the E.164 number to a Uniform Resource Indicator (URI) at step 154.

Proceeding to line 156, the ENUM database 108 may return a non-SIP/non-TEL URI to the S-CSCF 106 based on the query. Based on the non-SIP/non-TEL URI, at line 158, the S-CSCF 106 may query a domain name system (DNS) 110 of the IMS HN 100 to resolve a domain name of the non-SIP/non-TEL URI to an IP address. At line 160, the DNS 110 may return the IP address of the non-SIP/non-TEL URI domain, rather than an unresolved message (e.g., a "not-found" message), to the S-CSCF 106. The IP address is an alternative address for an alternative communication server of the callee.

At line 162, the S-CSCF 106 of the caller's HN 100 may forward the alternative address, and potentially one or more other alternative addresses of the callee, to the UE 102 of the caller. The UE includes a prioritizer 112 to process and/or prioritize the alternative addresses. Multiple alternative URIs can be obtained either by iteratively retrieving the alternative URIs from the ENUM database 108 and/or by retrieving all alternative URIs at once. The prioritizer 112 may use an implicit and/or explicit protocol field of the alternative URIs to determine each alternative application protocol that is available for communications. Persons of ordinary skill in the art will appreciate that the protocol field may be implied by a URI. Various alternatives may be made available at the UE 102 for a user to manually select, or the prioritizer 112 may invoke various automated processes, as discussed in further detail below. For example, the UE 102 or another device may display the various alternatives in a list. Based on a manual selection of one or more of the alternatives, the caller may initiate one or more alternative forms of communication (to the callee), including, but not limited to e-mail, IM, fax, and/or web. The one or more alternative forms of communication can be performed using the UE 102 or another device of the caller.

FIG. 1 illustrates an example alternative of an e-mail URI option, but persons of ordinary skill in the art will appreciate that any other URI option may also be employed in a similar manner. Based on the selection of the e-mail option at line 164, the caller uses the UE 102 to initiate sending an e-mail message to a sending (the caller's) mail user agent (MUA) 114. This may include the caller dynamically composing contents of the e-mail message using the UE 102 and/or may include the UE 102 retrieving pre-composed content for the e-mail message.

Continuing to line 166, the caller's MUA 114 forwards the e-mail message to the caller's mail transfer agent (MTA) 116. At line 168, the caller's MTA 116 forwards the e-mail message to a callee's MTA 118. Additionally, at line 170, the callee's MTA 118, in response, forwards the e-mail message to a callee's mail user agent (MUA) 120. At line 172, the callee's MUA 120 delivers the e-mail message to the callee's UE 122. The callee's UE 122 displays the e-mail message to the callee.

As discussed in further detail below, if the prioritizer 112 receives an error message after attempting to send the e-mail message, the prioritizer 112 may use any additional non-SIP/non-TEL URIs to send a message to the callee. In this case, the prioritizer 112 may automatically retrieve any additional non-SIP/non-TEL URIs by retrying an ENUM query if the prioritizer 112 did not receive the complete list of available URIs (line 156). The prioritizer 112 may attempt to communicate with the callee using a different alternative address and/or via pre-determined communication methods in view of optimization objectives, as discussed in further detail below. The process of attempting communication using the additional URIs may be repeated until communication is successful and/or until no more additional URIs exist for the callee and/or one or more communication attempts have been made. Additionally, the caller's device may not receive confirmation that one or more attempts were successful.

Figure 2:
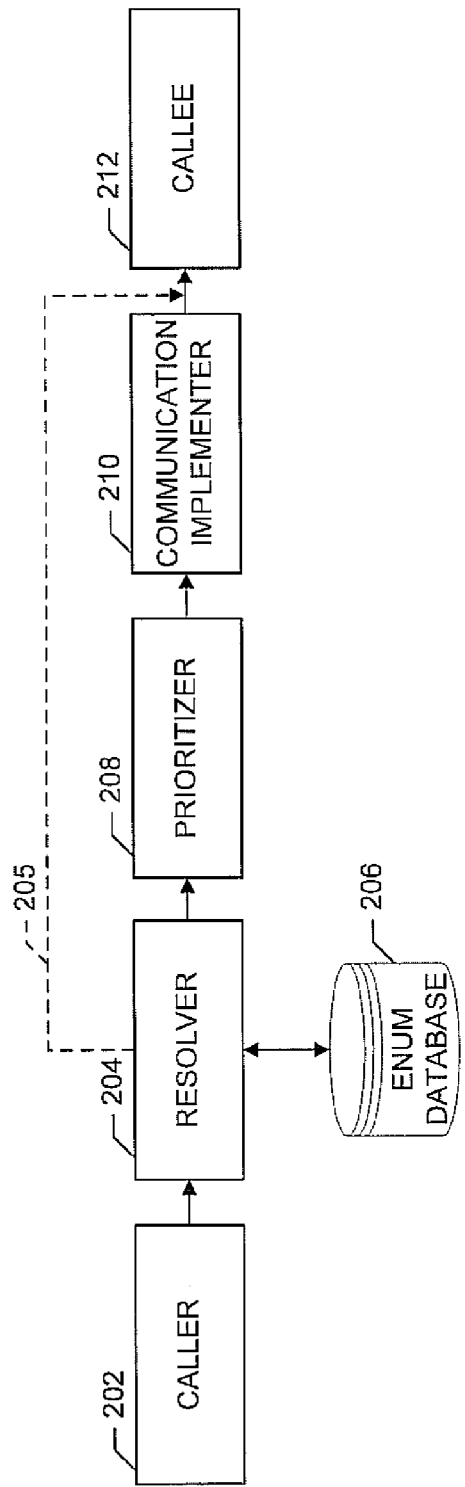
FIG. 2 is a block diagram of an example system to prioritize communications in IMS networks.

An example system 200 to prioritize communications in IMS networks is shown in FIG. 2. In the illustrated example, a caller 202 dials an E.164 number of a callee 212, which is received by a resolver 204. The resolver queries an ENUM database 206 to determine if the callee 212 has an associated SIP and/or TEL URI. If such an SIP and/or TEL URI exists for the callee 212, the call is routed 205 to the callee 212 via the SIP and/or TEL URI. However, if the ENUM database 206 query by the resolver 204 returns non-SIP and/or non-TEL URIs, then such URIs are passed to a prioritizer 208, which may route the caller 202 to the callee 212 via one or more user-defined (caller-defined) techniques. As discussed below, such caller-defined techniques may include, but are not limited to, invoking pre-specified processes and/or dynamically-selected processes to prioritize callee 212 URIs. The caller-defined techniques may also include invoking caller-specified processes based on current call parameters, such as, for example, available ENUM protocols, available service types, message urgency, callee groups (where a group may include only one callee or more than one callee), cost thresholds of alternate URI usage, callee UE capabilities, caller capabilities, time-of-day, date, day of week/month/year, and/or URI error handling.

Any URI selection(s) made by the prioritizer 208 are transferred to a communication implementer 210 to facilitate transmitting the caller's 202 message to the callee 212. For example, as described above in view of FIG. 1, the transmission included e-mail implementation systems that employed caller MUAs, caller MTAs, callee MUAs, and callee MTAs. However, persons of ordinary skill in the art will appreciate that any alternate communication implementation systems may be employed by the communication implementer 210 to facilitate message transmission from the caller 202 to the callee 212. Such alternate communication implementation systems may include, but are not limited to, IM systems, web-based systems, and/or fax systems.

Figure 3:
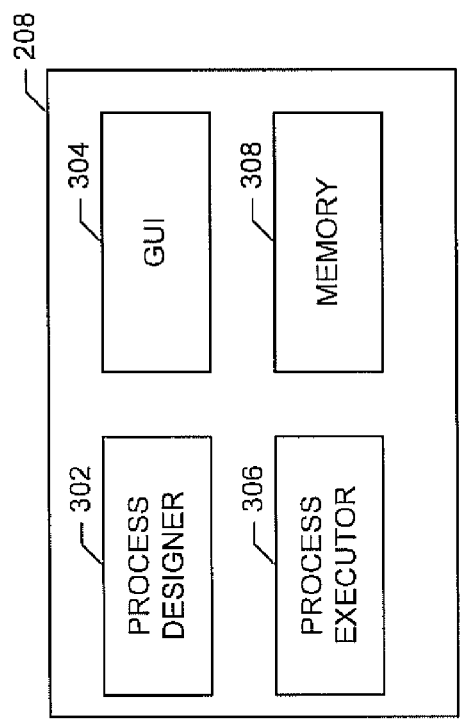
FIG. 3 is a block diagram of an example prioritizer that may be used by the example system of FIG. 2.

An example prioritizer 208 is shown in FIG. 3. In the illustrated example, the caller may configure the prioritizer 208 to select and/or prioritize (optimization may be a subset of prioritization) URI selections using a process designer 302. As described above, URI selections may occur based on various current call parameters, such as cost. The example process designer 302 may include a graphical user interface (GUI) 304 to allow the caller to configure selection parameters in the prioritizer 208 to prioritize URI(s) based on one or more algorithms, which are used to customize the selection for the caller. Selection parameters may include current call parameters that are constrained within pre-determined threshold boundaries, such as a threshold time-of-day parameter, and/or other pre-determined types. Briefly turning to FIG. 4, an example GUI 400 includes various configuration tabs to allow a caller to configure selection parameters and prioritize URI implementation based on several different types of current call parameters. The example GUI 400 includes a cost tab 402, an available ENUM priority tab 404, an urgency priority tab 406, a callee group priority tab 408, an error handle priority tab 410, a time of day (TOD) tab 412, and a hybrid tab 414. Persons of ordinary skill in the art will appreciate that the illustrated example tabs, and corresponding call parameters, are not exhaustive. Any additional call parameters and/or selection parameters may be employed as a decision constraint for URI selection, prioritization, and/or optimization.

The example GUI 400, in which the cost tab 402 is selected, illustrates caller-settable options related to the cost of URI usage. The caller is provided a URI identification (URI ID) column 416 to list various URIs returned from an ENUM query, a caller cost column 418 to display associated costs of each URI, and a transmission type column 420 to display the mode of caller to callee transmission. The caller cost column 418 and the transmission type column 420 are two examples of current call parameters. While the example GUI 500 illustrates four URIs in the URI ID column 416, any number of URIs may be listed depending on query results from the ENUM database, such as the example ENUM database 206 of FIG. 2. URIs 3 and 4 (rows 422 and 424, respectively) illustrate the lowest cost options (current call parameters) for the caller in the event that such URIs are selected as the desired technique of message transmission. Although the caller cost column 418 lists URI costs in terms of "low,"

"medium," and "high," persons of ordinary skill in the art will appreciate that numeric values may be listed in the caller cost column 418. For example, the caller may define the price threshold of "medium" to represent e-mail-based communications that cost between $0.05 and $0.15 per message. Caller cost information may be determined and/or entered by the caller based on, for example, independent caller research of various communications carrier companies (e.g., telecommunications companies), published rate information available via a web-page, and/or billing information based on prior URI usage. Without limitation, the prioritizer 208 may periodically update the memory 308 with updated values of various current call parameters. For example, the prioritizer 208 may automatically access service provider websites each day at any time and/or periodically to extract and/or accumulate rate information, available ENUM protocol or service types, and/or device capability information related to communication device features supported by the service provider. As a result, current information may be used by the prioritizer 208 during optimization of the current call parameters based on the selection parameters.

Based on the list of available URIs, and corresponding costs of using each available URI, the caller may prioritize a usage order with a priority column 426. The priority column 426 is an example of a selection parameter. The priority column 426 provides the caller with a drop-down selection for each available URI, wherein each drop-down selection includes an integer indicative of an order of URI use. For example, the caller has selected URI ID "3" (row 422) to have a priority of "1" (428). Conversely, the caller has selected URI ID "2" (row 430) to have the lowest priority of "4" because URI "2" (432) is the most expensive to the caller. In the illustrated example of FIG. 4, only the cost tab is shown. Other tabs, with the exception of a hybrid tab, follow a similar approach. The hybrid tab would allow the user to prioritize the other tabs. For example, the selection for callee group(s) may be selected to override the selection of cost. Persons of ordinary skill in the art will appreciate that implementation details vary without loss of generality.

Figure 4:
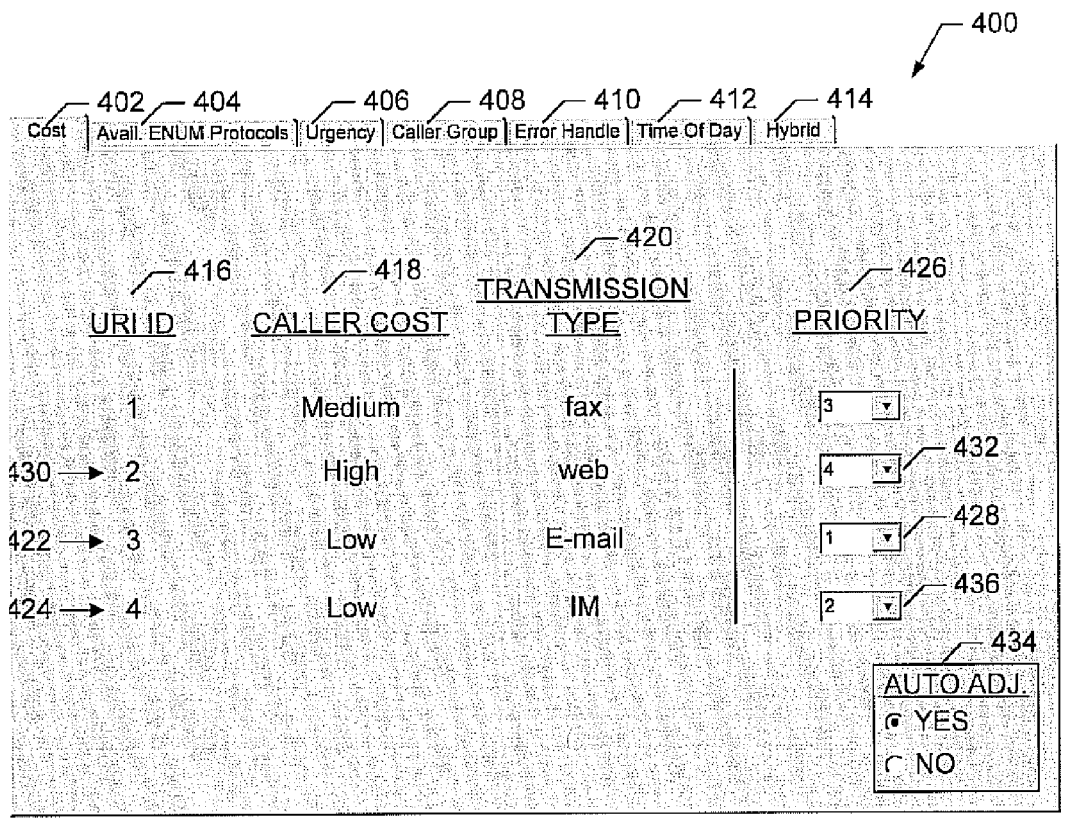
FIG. 4 is an example graphical user interface for use in the example system of FIG. 2.

Returning to FIG. 3, if the caller attempts to communicate with the callee, a process executor 306 will invoke the caller's cost settings of FIG. 4 such that priority selections will result in a first attempt to contact the callee via e-mail, a second attempt to contact the callee via IM, a third attempt to contact the callee via fax, and a fourth attempt to contact the callee via the callee's web interface.

Provisions may be employed for automatic adjustment of the priorities, thereby minimizing undesirable effects that may otherwise occur. For example, if the prioritizer 208 performs an automatic access of provider websites at, for example, 2:00 AM and determines that the caller cost 418 for a transmission type 420 of "IM" changed to "high" (row 424), then URI ID "4" would be invoked as the caller's automatic second choice, despite the cost increase. To prevent such undesirable effects, the caller may configure the "auto adjust" setting radio button 434 to "YES" instead of "NO." As a result, all current call parameters of cost will be linked/associated with a corresponding priority value. For instance, in the illustrated example, all cost indicators of "low" would be associated with a priority of "1" or "2," all "medium" current call parameters will be associated with a priority of "3," and all "high" current call parameters will be associated with a priority of "4," based on information that is accessible to the caller's device. Returning to the aforementioned hypothetical, in which the cost of URI "4" (row 424) changes from "low" to "high" after the caller's original selection(s), priority value 436 would automatically change from "2" to "4." When multiple URIs have the same priority level (e.g., "4"), the caller may specify alternate decision parameters and/or invoke a random number generator to make a selection.

Any number of various cost selection criteria settings may be configured by the caller and stored as a profile in a memory 308 of the example prioritizer 208. Similarly, any of the alternate caller-configurable parameter settings may be stored as a profile in the memory 308 for use during communication attempts between the caller and the callee. For example, profiles for the ENUM priority tab 404, the urgency priority tab 406, the callee group priority tab 408, the error handle priority tab 410, the TOD tab 412, and/or the hybrid tab 414, each of which are discussed in view of FIG. 6, may be stored in the memory 308. Additionally, the "hybrid" tab may be used to allow the caller to select the priorities of the other tabs using any algorithm. For example, the caller may decide to use e-mail communications only during the 1:00 AM to 6:00 AM hours by associating the highest priority to e-mail in the TOD tab, and selecting the TOD tab to have the highest priority over other tabs (such as the Cost tab).

Figure 5:
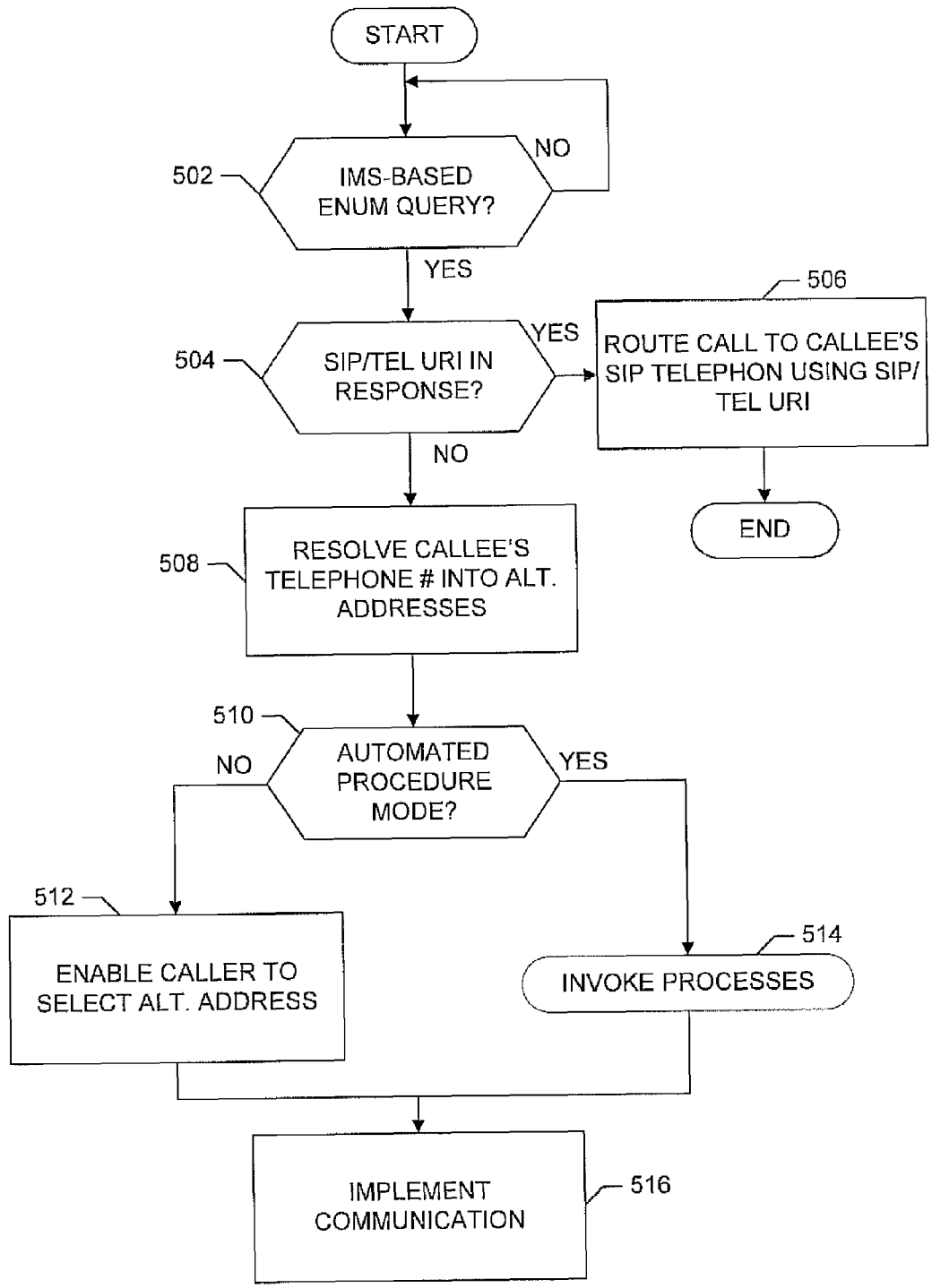
FIGS. 5-7 are flow diagrams of example processes to prioritize communications in IMS networks.
Figure 6:
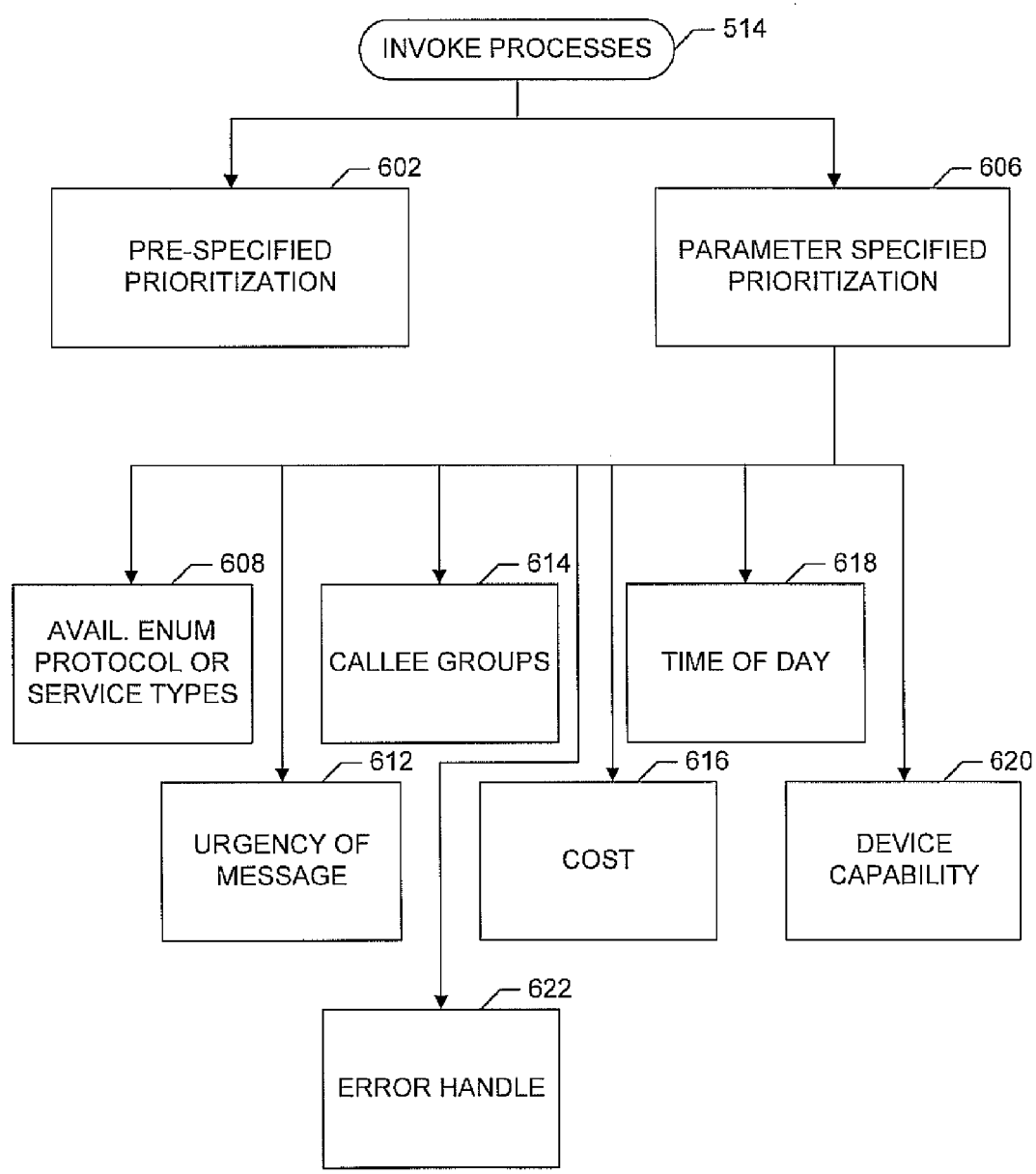
Figure 7:
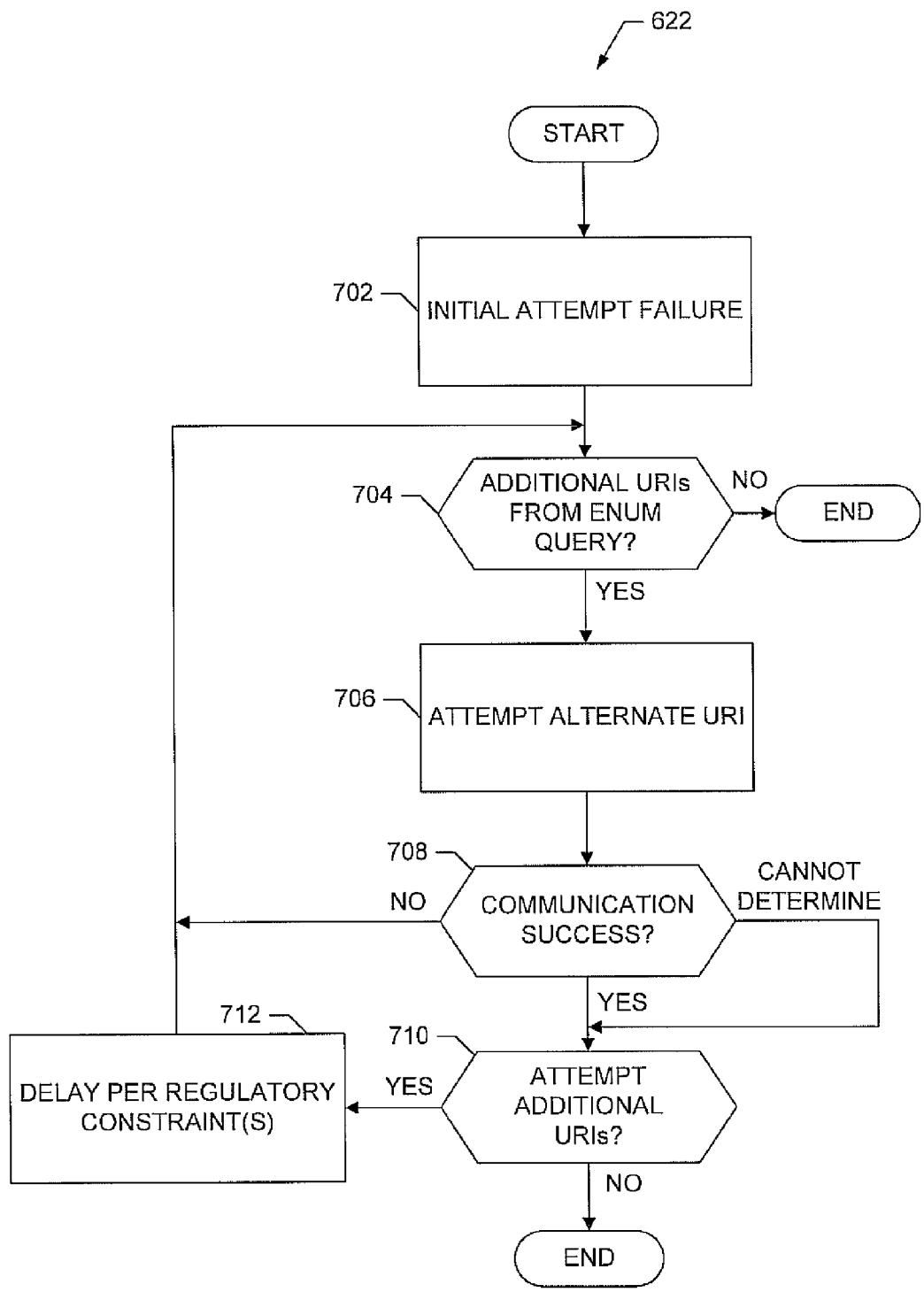

Flowcharts representative of processes for implementing the example systems, methods, and apparatus to prioritize communications in IMS networks of FIGS. 1-3 are shown in FIGS. 5-7. In one example, these processes may be implemented by using logic, such as machine readable instructions that include a program for execution by: (a) a processor such as the processor 810 shown in the example computer 800 discussed below in connection with FIG. 8, (b) a controller, and/or (c) any other suitable processing device. The program may be embodied in software stored on a tangible medium such as, for example, a flash memory, a CD-ROM, a floppy disk, a hard-drive, a digital versatile disk (DVD), or a memory associated with the processor 810, but persons of ordinary skill in the art will readily appreciate that the entire program and/or parts thereof could alternatively be executed by a device other than the processor 810 and/or embodied in firmware or dedicated hardware in a well-known manner (e.g., it may be implemented by an application specific integrated circuit (ASIC), a programmable logic device (PLD), a field programmable logic device (FPLD), discrete logic, etc.). For example, any or all of the systems, methods, and apparatus to prioritize communications in IMS networks, the caller UE 102, the P-CSCF 104, the S-CSCF 106, the ENUM database 108, 206, the DNS 110, the prioritizer 112, 208, the callers MUA 114, the caller's MTA 116, the callee's MTA 118, the callee's MUA 120, the callee's UE 122, the communication implementer 210, the process designer 302, and/or the processor executor 306 could be implemented by software, hardware, and/or firmware.

Also, some or all of the processes represented by the flowcharts of FIGS. 5-7 may be implemented manually. Further, although the example processes are described with reference to the flowcharts illustrated in FIGS. 5-7, persons of ordinary skill in the art will readily appreciate that many other methods of implementing the example machine readable instructions may alternatively be used. For example, the order of execution of the blocks may be changed, and/or some of the blocks described may be changed, substituted, eliminated, or combined.

The process of FIG. 5 begins at block 502 where the example resolver 204 monitors requests from one or more callers 202 for establishing calls. In particular, the resolver determines if the caller 202 makes an IMS-based ENUM query using, for example, an E.164 number of a callee. The caller may use a calling device, such as an intelligent IP device that supports multiple protocols and functions either automatically and/or based on active requests by the caller

202. Examples of the protocols include, but are not limited to, an IP telephony protocol usable in VoIP communications, a Hypertext Transfer Protocol (HTTP) typically employed for web-based communications, an IM protocol employed to send and receive instant messages, an e-mail protocol employed to send and receive e-mail messages, and/or a fax protocol employed to send and receive faxes.

A reverse ordering of digits in the telephone number, followed by ".e164.arpa," may be included in the IMS-based ENUM query, as appreciated by persons of ordinary skill in the art. The IMS-based ENUM query is typically constructed by an IMS node in response to receiving a SIP request. The ENUM database responds to the IMS-based ENUM query (block 502) by looking-up the E.164 number to find any associated URIs. Any SIP/TEL URIs found in the ENUM database (block 504) may be included in a result list, which may be communicated in a reply message to the IMS node. The resolver may determine whether the response includes a SIP URI or a TEL URI (block 504) by searching for a prefix "sip:" and/or "tel:" in a protocol field. If either prefix is included in the protocol field, the call is routed to the callee's telephone using the SIP URI and/or the TEL URI (block 506). Such routing to the callee's telephone may include a query made to a DNS, which may return an IP address of the callee.

However, if the response does not include a SIP and/or TEL URI (block 504), then the call cannot be routed in IMS. Accordingly, the prioritizer may route the call based on alternate URIs, current call parameter optimization(s), call selection parameters, and/or priority constraints (block 508). The calling device and/or prioritizer can further resolve the callee's telephone number by accessing a local database accessible to the caller and/or a network database at a remote location (e.g., in the IMS network). The alternate URIs may be of any variety of forms and/or extensions including, but not limited to, e-mail addresses, IM addresses, web page addresses, and/or Internet web service addresses. E-mail addresses may be prefixed by a protocol field including "mailto:;" IM addresses may be prefixed by a protocol field including "im:;" and web page addresses may be prefixed by a protocol field such as "http:." Other existing and future URIs and other existing and future protocols may be within the scope of this disclosure. For example, this same approach may be adapted to work with Internet web services and WSDL-based interfaces. Parameters for Internet web page and/or web services interface calls may be included and specified using parameter parsing methods for automated communications, as will be appreciated by persons of ordinary skill in the art.

The prioritizer 112, 208 may determine whether the caller manually selects an alternate URI or allows automated selection(s) to be invoked (block 510). If the caller manually selects alternate URIs, the calling device receives a selection of various alternative URIs from which the caller may use to communicate with the callee (block 512). The selection may be for one alternative address, more than one, but less than all of the alternative addresses, or a selection of all alternative addresses. Additionally, any subset of the alternative URIs may be selected by the caller. For example, a dynamically selected URI may occur when the caller receives all ENUM services returned by the ENUM database 108, 206 to reach the callee 122, 212. The caller 102, 202 may select a connection mode (e.g., e-mail, voice, IM, web, etc.) via a list-based selection and/or menu, and/or a voice activated selection to the available ENUM services returned (e.g., SIP, H323, IM, mailto:, tel:, http:, etc.).

On the other hand, the caller may configure the prioritizer to invoke an automatic process (block 514). Regardless of whether the caller manually selects one or more alternative URIs, or the URIs are selected automatically, communication initiation between the caller and the callee may be facilitated by the communication implementer 210 (block 516). Each URI may use a particular protocol associated with the communication and may be initiated by the calling device, communication implementer 210, and/or another communication device. Such communications may include, but are not limited to, e-mail messages, IMs, web browsing, faxes, and/or any combination thereof.

A flowchart representative of a process for invoking processes (block 514 in FIG. 5) is shown in FIG. 6. The process 514 of FIG. 6 begins by the prioritizer 112, 208 determining which caller-designed process to invoke. As discussed in further detail below, the caller-designed processes may include pre-specified prioritizations (block 602) and parameter specified prioritization (block 606), which optimize selections based on comparisons between current call parameters and selection parameters. Additionally, the parameter specified prioritization (block 606) may include, but is not limited to, determining available ENUM protocol(s) and/or service types (block 608), determining a message urgency (block 612), determining callee groups (block 614), determining URI costs (block 616), determining time-of-day (TOD) usage (block 618), determining device capability (block 620), and/or any combination thereof (e.g., a prioritized hybrid of various parameters).

The pre-specified prioritization (block 602) may, for example, include an ENUM naming authority pointer (NAPTR), which is an existing type of DNS record that supports expression-based rewriting. As appreciated by persons of ordinary skill in the art, NAPTR records include an order value/field, which specifies the order in which records must be processed when multiple NAPTR records are returned in response to a query. Additionally, or alternatively, if more than one record contains an identical order field, then a preference field may determine the order of processing.

The parameter specified prioritization (block 606) may include determining available ENUM protocol(s) and/or service types (block 608). Persons of ordinary skill in the art will appreciate that ENUM and/or NAPTR records may identify protocols and service types. For example, a first record may describe that a domain "4.3.2.1.6.7.9.8.6.4.e164.arpa" includes SIP while a second record may, instead, include SMTP. A caller may receive a similar list and configure the prioritizer 112, 208 to always select SMTP, if available. Note that these records may include an order value field that indicates the domain should be contacted by SIP, however the caller may configure the prioritizer 112, 208 to proceed with caller-to-callee communications in any manner.

The parameter specified prioritization (block 606) may also include determining an urgency of a message as a basis for which ENUM service to invoke (block 612). For example, if a particular message includes an identifier and/or flag indicative of a high-priority and/or urgent message, then the prioritizer 112, 208 may invoke any and all available URIs returned from an ENUM query. Such invocation of any and all available URIs may occur despite alternate URI usage constraints configured by the caller, such as those based on cost. As discussed below, hybrid parameter profiles may be configured by the caller to include various combinations and/or permutations of multiple parameters. For example, the caller 102, 202 may configure callee groups (block 614) to send messages, news, and/or advertising to multiple parties simultaneously. However, despite any ENUM query results that may indicate a callee's preferred URI contact mode (e.g., fax versus e-mail), the caller may employ the cost determination process (block 616) to, instead, select the least expensive communication technique. Similarly, the caller may configure the prioritizer 112, 208 to communicate with the callee groups identified in the callee groups process (block 614) only after a particular time specified, for example, in the TOD process (block 618). As appreciated by persons of ordinary skill in the art, the TOD process (block 618) may cooperate with the cost process (block 616) to determine optimum caller price objectives so that caller-to-callee communication can occur in a cost judicious manner.

The parameter specified prioritization (block 606) may also include a device capability process (block 620) to enable error tolerant and efficient caller-to-callee communications for non-SIP/non-TEL URIs. As described above, if a non-SIP/non-TEL URI is returned from an ENUM query in an IMS network, the call is not routed. While the systems, methods, and apparatus described herein abate such a situation, if a caller attempts to communicate to a callee via, for example, an IM, the communication attempt may fail if the callee's UE 122 does not support IM communications. As a result, the device capability process (block 620) may be invoked to attempt alternate URIs, thereby increasing the chances of successful communication between the caller and the callee.

The parameter specified prioritization (block 606) may also include an error handle process (block 622) to invoke alternate communication paths when a prior attempt fails. As discussed below in view of FIG. 7, the example error handle process (block 622) identifies a communication attempt failure, determines whether additional URIs are available as subsequent alternative communication paths, implements any known alternative communication paths, and/or determines if such attempted alternatives were successful. Additionally, the example error handle process (block 622) may repeat communication attempts with alternate communication paths until a successful alternative is found, allow additional communication path possibilities to be attempted, and/or report that communication success can not be determined. In view of various regulatory constraints associated with redial attempts, a time delay may be invoked prior to attempting alternate URIs when searching for a URI that results in a successful communication attempt.

FIG. 7 illustrates an example process to complete a communication attempt when the initial attempt fails, when a communication attempt cannot be determined, and/or when the user is offered additional call attempt opportunities. The process 622 of FIG. 7 begins upon determining that an initial communication attempt to the callee has failed (block 702). For example, a communication attempt may fail due to a lack of feature capability for the callee's phone to handle web-based messaging. Accordingly, persons of ordinary skill in the art will appreciate that FIG. 7 may also represent all or part of the example process 620. The prioritizer 112, 208 determines if additional URIs are available for the callee as a result of the ENUM query (block 704). However, persons of ordinary skill in the art will appreciate that a subsequent ENUM query may occur to determine if the callee has any other URIs available. If no additional URIs are available to make subsequent communication attempts, the process ends with a failed communication attempt. On the other hand, if the ENUM query returns additional alternate URIs, such alternate URIs are attempted (block 706).

If the other attempted URI from the ENUM query successfully delivers the communication information (e.g., text message) (block 708), then the caller is offered an opportunity to attempt additional URIs (block 710) that were returned from the ENUM query of block 704. For example, because at least one prior communication attempt failed, the caller may know that any alternate URIs employed to communicate with the callee are checked less frequently. As a result, the opportunity to attempt additional URIs (block 710) may allow the caller to employ message communication redundancy in an effort to make sure the callee gets any particular message in a timely manner.

Communication networks, such as telecommunication services and/or infrastructure of various countries, are bandwidth limited. Furthermore, some of the communication networks are not privately owned by corporations and, instead, are owned and operated by government entities. In an effort to maintain appropriate amounts of bandwidth for users of such communication networks, the government entities may impose regulatory limitations to limit excessive bandwidth consumption that may result from redial attempts (block 712). Persons of ordinary skill in the art will appreciate that private and/or publicly held corporations may also employ such constraints in an effort to accommodate an adequate bandwidth for their subscribers. The process then returns to block 704 to attempt an additional alternate URI, if available.

Figure 8:
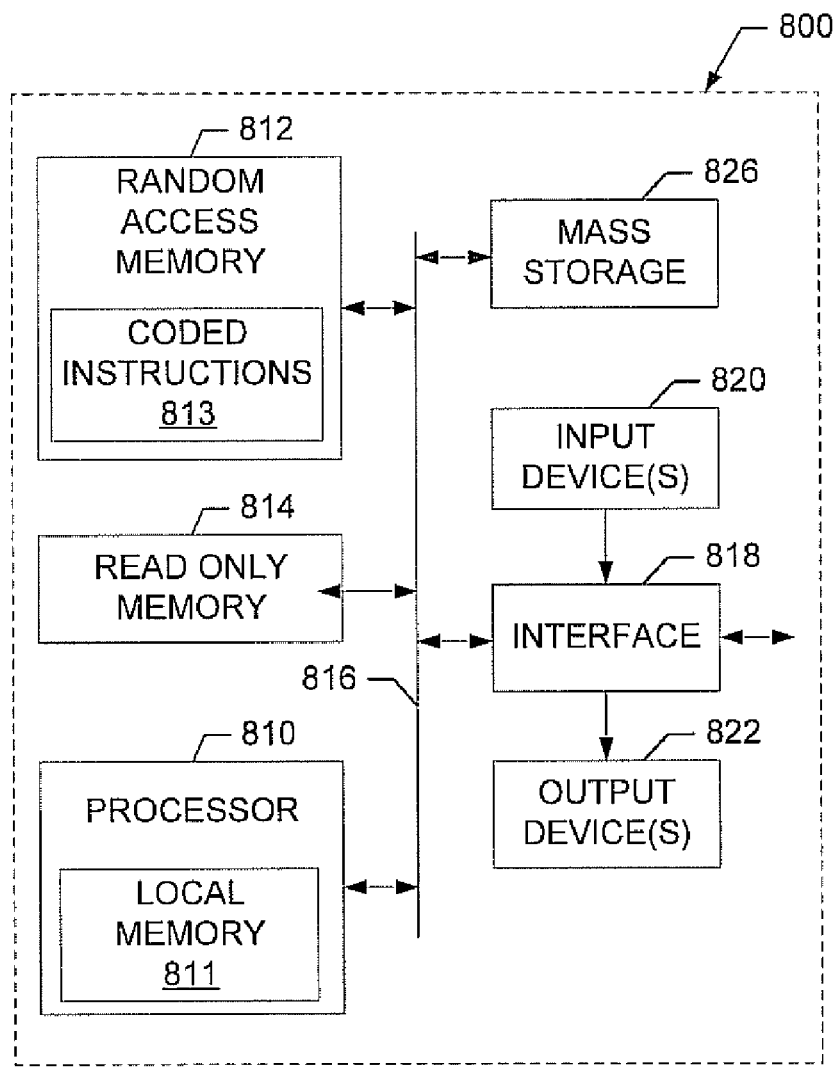
FIG. 8 is a schematic illustration of an example computer that may carry out the processes of FIGS. 5-7 to implement the example systems, methods, and apparatus to prioritize communications in IMS networks.

FIG. 8 is a block diagram of an example computer 800 capable of implementing the apparatus and methods disclosed herein. The computer 800 can be, for example, a server, a personal computer, a laptop, a PDA, or any other type of computing device.

The computer 800 of the instant example includes a processor 810 such as a general purpose programmable processor. The processor 810 includes a local memory 811, and executes coded instructions 813 present in the local memory 811 and/or in another memory device. The processor 810 may execute, among other things, the example processes illustrated in FIG. 5-7. The processor 810 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 810 is in communication with a main memory including a volatile memory 812 and a non-volatile memory 814 via a bus 816. The volatile memory 812 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 814 may be implemented by flash memory and/or any other desired type of memory device. Access to the main memory 812, 814 is typically controlled by a memory controller (not shown) in a conventional manner.

The computer 800 also includes one or more interface circuits 818. Each interface circuit 818 may be implemented by any type of interface standard, such as an Ethernet interface, a universal serial bus (USB), and/or a third generation input/output (3GIO) interface.

One or more input devices 820 are connected to the interface circuit 518. The input device(s) 820 permit a user to enter data and commands into the processor 810. The input device(s) can be implemented by, for example, a keyboard, a mouse, a touchscreen, a track-pad, a trackball, isopoint and/or a voice recognition system.

One or more output devices 822 are also connected to the interface circuit 818. The output devices 822 can be implemented, for example, by display devices (e.g., a liquid crystal display, a cathode ray tube display (CRT), a printer and/or speakers). The interface circuit 818, thus, typically includes a graphics driver card.

The interface circuit 818 also includes a communication device such as a modem or network interface card to facilitate exchange of data with external computers via a network (e.g., an Ethernet connection, a digital subscriber line (DSL), a telephone line, coaxial cable, a wireless telephone system, cellular, etc.).

The computer 800 also includes one or more mass storage devices 826 for storing software and data. Examples of such mass storage devices 826 include floppy disk drives, hard drive disks, compact disk drives and digital versatile disk (DVD) drives. The mass storage device 826 may implement the ENUM database 108, 206, and/or any of the databases connected to the prioritizer 112, 208.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising a processor to:
   receive a telephone number from a calling device;
   locate a data record based on the telephone number, the data record comprising a plurality of non-session initiation protocol uniform resource identifiers and non-telephone number uniform resource identifiers;
   receive a current call parameter value associated with at least one of the plurality of non-session initiation protocol uniform resource identifiers and non-telephone number uniform resource identifiers;
   access a prioritization profile comprising a selection parameter having a first priority order value, the first priority order value linked to the current call parameter value;
   generate a ranked list of the plurality of non session initiation protocol uniform resource identifiers and non telephone number uniform resource identifiers based on the current call parameter value at a first time;
   adjust the selection parameter from the first priority order value to a second priority order value in response to a change of the current call parameter value at a second time;
   compare the current call parameter value at the second time to the prioritization profile to select one of the plurality of ranked non session initiation protocol uniform resource identifiers and non-telephone number uniform resource identifiers as a destination for the telephone number; and
   establish a communication session between the calling device and the one of the plurality of non-session initiation protocol uniform resource identifiers and non-telephone number uniform resource identifiers selected.

2. An apparatus as defined in claim 1, wherein the non-session initiation protocol uniform resource identifiers and non-telephone uniform resource identifiers comprise at least one of an e-mail uniform resource identifier, an instant message uniform resource identifier, a fax uniform resource identifier, or a web uniform resource identifier.

3. An apparatus as defined in claim 1, further comprising a resolver to locate the data record based on the telephone number, the resolver comprising an ENUM query engine to query an ENUM database.

4. An apparatus as defined in claim 1, further comprising a prioritizer to compare the current call parameter value with a threshold to select the destination for the telephone number.

5. An apparatus as defined in claim 4, wherein the prioritizer comprises a process designer to at least one of create, delete, or modify the prioritization profile.

6. An apparatus as defined in claim 4, wherein the prioritizer comprises a graphical user interface (GUI) to facilitate at least one of prioritization profile design, creation, deletion, or modification.

7. An apparatus as defined in claim 4, wherein the prioritizer comprises a memory to store at least one of the prioritization profile, the current call parameter value, or the selection parameter.

8. An apparatus as defined in claim 4, wherein the prioritizer comprises a process executor to execute the prioritization profile.

9. An apparatus as defined in claim 8, wherein the process executor executes the prioritization profile by selecting the one of the plurality of non-session initiation protocol uniform resource identifiers and non-telephone number uniform resource identifiers.

10. An apparatus comprising:
    an interactive Internet protocol multimedia subsystem (IMS); and
    an electronic processor to:
       locate a data record based on a telephone number; and
       execute a prioritization process to generate a ranked list of non-session initiation protocol or non-telephone number uniform resource identifiers based on a first priority order value linked to a current call parameter value at a first time, adjust the first priority order value to a second priority order value in response to a change of the current call parameter value at a second time, compare the current call parameter value at the second time to a prioritization profile, and route a communication session initiated for the telephone number to a destination associated with the ranked non-session initiation protocol uniform resource identifier or the ranked non-telephone number uniform resource identifier based on the comparison.

11. An apparatus as defined in claim 10, wherein the non-session initiation protocol uniform resource identifier or non-telephone number uniform resource identifier comprises at least one of an e-mail uniform resource identifier, an instant message uniform resource identifier, a fax uniform resource identifier, or a web uniform resource identifier.

12. An apparatus as defined in claim 10, further comprising a memory to store the data record as at least one of an ENUM data record or a naming authority pointer (NAPTR) record.

13. An apparatus as defined in claim 10, wherein the electronic processor is to:
    prioritize the at least one of the non-session initiation protocol uniform resource identifier or the non-telephone number uniform resource identifier; and
    select one of the at least one of the non-session initiation protocol uniform resource identifier or the non-telephone number uniform resource identifier matching a priority threshold.

14. An apparatus as defined in claim 13, wherein the priority threshold comprises at least one of a message urgency, a message cost, a message protocol type, a message service type, a destination device capability, or a time of day.

15. An apparatus as defined in claim 10, wherein the prioritization process comprises a predetermined uniform resource identifier priority to select the communication session.

16. An apparatus as defined in claim 10, wherein the communication session comprises at least one of e-mail messages, instant messaging, fax messages, or web page communication.

17. An apparatus as defined in claim 10, further comprising a graphical user interface (GUI) to enable prioritization process design.

18. An apparatus as defined in claim 17, wherein a caller designs the prioritization process via the GUI.

19. A method comprising:
locating, with a resolver, an ENUM database record for a telephone number specifying at least one non-Internet Protocol Multimedia Subsystem (IMS) destination;
accessing, with a prioritizer, a prioritization profile comprising a selection parameter having a first priority order value linked to a current call parameter value;
generating a ranked list of a plurality of non-session initiation protocol uniform resource identifiers or non-telephone number uniform resource identifiers based on the current call parameter value at a first time;
adjusting the selection parameter from the first priority order value to a second priority order value in response to a change of the current call parameter value at a second time;
comparing the current call parameter value at the second time to the prioritization profile to select at least one of the plurality of non-session initiation protocol uniform resource identifiers or non-telephone number uniform resource identifiers as a destination for the telephone number; and
establishing a communication session between the calling device and the selected uniform resource identifier.

20. A method as defined in claim 19, wherein the plurality of non-session initiation protocol uniform resource identifiers or non-telephone number uniform resource identifiers comprise at least one of an e-mail uniform resource identifier, an instant message uniform resource identifier, a fax uniform resource identifier, or a web uniform resource identifier.

21. A method as defined in claim 19, wherein the selection parameter in the prioritization profile ranks the plurality of non-session initiation protocol uniform resource identifiers or non-telephone number uniform resource identifiers based on at least one of a communication session cost, a time of day, a destination device capability, a callee group, a communication session urgency, or a communication session service type.

22. A method as defined in claim 21, wherein ranking based on the destination device capability further comprises:
receiving a failure notice for a first communication session attempt; and
initiating a second communication session attempt with an alternate non-IMS destination.

23. A method as defined in claim 19, further comprising initiating a second communication session attempt with an alternate non-IMS destination when a response to a first communication session attempt is at least one of success, failure, or undetermined.

24. A method as defined in claim 21, wherein ranking based on the communication session cost further comprises:
determining the cost of a plurality of communication sessions;
ranking the plurality of communication sessions based on the cost; and
selecting at least one of the plurality of communication sessions based on a cost threshold.

25. A method as defined in claim 21, wherein the communication session service type is at least one of e-mail, voicemail, instant messaging, or fax.

26. A method as defined in claim 21, wherein ranking based on the communication session urgency enables the uniform resource identifier selection without regard to at least one of the communication session cost, or the communication session service type.

27. A method as defined in claim 19, further comprising selecting an alternate uniform resource identifier from the plurality of non-session initiation protocol uniform resource identifiers or non-telephone number uniform resource identifiers when the routed communication session between the calling device and the selected uniform resource identifier fails.

28. A method as defined in claim 27, wherein selecting the alternate uniform resource identifier comprises selecting additional alternate uniform resource identifiers from the plurality of non-session initiation protocol uniform resource identifiers or non-telephone number uniform resource identifiers.

29. A tangible article of manufacture comprising a computer readable medium encoded with executable instructions that, when executed, cause a machine to, at least:
locate an ENUM database record for a telephone number specifying a non-Internet Protocol Multimedia Subsystem (IMS) destination;
receive a current call parameter value associated with each of a plurality of non-session initiation protocol uniform resource identifiers and non-telephone number uniform resource identifiers;
access a prioritization profile comprising a selection parameter associated with each of the uniform resource identifiers and having a first priority order value;
generate a ranked list of the plurality of non-session initiation protocol uniform resource identifiers and non-telephone number uniform resource identifiers based on the current call parameter value at a first time;
adjust the selection parameter from the first priority order value to a second priority order value in response to a change of the current call parameter value at a second time;
compare the current call parameter value at the second time to the prioritization profile to select at least one of the plurality of ranked non-session initiation protocol uniform resource identifiers and ranked non-telephone number uniform resource identifiers as a destination for the telephone number; and
establish a communication session between the calling device and the selected uniform resource identifier.

30. A tangible article of manufacture as defined in claim 29, wherein the non-session initiation protocol uniform resource identifiers and non-telephone number uniform resource identifiers comprise at least one of an e-mail uniform resource identifier, an instant message uniform resource identifier, a fax uniform resource identifier, or a web uniform resource identifier.

31. A tangible article of manufacture as defined in claim 29, wherein the executable instructions further cause the machine to rank the plurality of non-session initiation protocol uniform resource identifiers and non-telephone number uniform resource identifiers based on at least one of a communication session cost, a time of day, a destination device capability, a callee group, a communication session urgency, or a communication session service type.

32. A tangible article of manufacture as defined in claim 31, wherein the executable instructions further cause the machine to receive a failure notice for a first communication session attempt, and initiate a second communication session attempt with an alternate non-IMS destination.

33. A tangible article of manufacture as defined in claim 29, wherein the executable instructions further cause the machine to initiate a second communication session attempt with an alternate non-IMS destination when a response to a first communication session attempt is at least one of success, failure, or undetermined.

34. A tangible article of manufacture as defined in claim 31, wherein the executable instructions further cause the machine to:
   determine the cost of a plurality of communication sessions;
   rank the plurality of communication sessions based on the cost; and
   select at least one of the plurality of communication sessions based on a cost threshold.

35. A tangible article of manufacture as defined in claim 31, wherein the executable instructions further cause the machine to route a communication service type of at least one of e-mail, voice-mail, instant messaging, or fax.

36. A tangible article of manufacture as defined in claim 31, wherein the executable instructions rank the uniform resource identifier based on the communication session urgency without regard to at least one of the communication session cost, or the communication session service type.

37. A tangible article of manufacture as defined in claim 29, wherein the executable instructions further cause the machine to select an alternate uniform resource identifier from the plurality of non-session initiation protocol uniform resource identifiers and non-telephone number uniform resource identifiers when the routed communication session between the calling device and the selected uniform resource identifier fails.

38. A tangible article of manufacture as defined in claim 37, wherein the executable instructions cause the machine to select additional alternate uniform resource identifiers from the plurality of non-session initiation protocol uniform resource identifiers Of and non-telephone number uniform resource identifiers.

39. A tangible article of manufacture comprising a computer readable medium encoded with executable instructions that, when executed, cause a machine to invoke a user interface for prioritizing communications in Internet Protocol Multimedia Subsystem networks, the user interface comprising:
   a prioritization profile screen area to display a plurality of selection parameters; and
   a selection parameter configuration area to display a plurality of selection parameter thresholds and a ranked list of non-session initiation protocol or non-telephone number uniform resource identifiers generated based on current call parameters at a first time and to display an adjusted ranked list in response to a comparison between the plurality of selection parameter thresholds and current call parameters at a second time.

40. An apparatus to prioritize Internet multimedia subsystem (IMS) network communication comprising:
   an ENUM database to store a plurality of non-telephone number and non-session initiation protocol uniform resource identifiers in association with respective telephone numbers;
   a resolver to receive a telephone number from a caller, the resolver to generate a base list of non-telephone number uniform resource identifiers and non-session initiation protocol uniform resource identifiers; and
   a prioritizer to generate a first ranked list of the plurality of non-telephone number uniform resource identifiers and non-session initiation protocol uniform resource identifiers from the base list based on a comparison between a prioritization profile having first priority order values associated with each of the uniform resource identifiers, the first priority order values based on current call parameters during a first time, and the prioritizer to adjust the first priority order values to second priority order values based on current call parameters during a second time to generate a second ranked list of the uniform resource identifiers, at least one of the resolver or the prioritizer comprising a logic circuit.

41. An apparatus as defined in claim 40, wherein the resolver comprises an ENUM query engine to query the ENUM database.

42. An apparatus as defined in claim 40, wherein the resolver is to receive the telephone number as an E.164 number.

43. An apparatus as defined in claim 40, wherein the prioritizer comprises a process executor to retrieve the prioritization profile from a memory, the process executor to compare the list of non-telephone number uniform resource identifiers and non-session initiation protocol uniform resource identifiers with the prioritization profile.

44. An apparatus as defined in claim 43, wherein the prioritization profile comprises a plurality of selection parameters, the process executor is to select at least one of the plurality of non-telephone number uniform resource identifiers and non-session initiation protocol uniform resource identifiers based on the comparison between the selection parameters and the list of non-telephone number uniform resource identifiers and non-session initiation protocol uniform resource identifiers.

45. An apparatus as defined in claim 44, wherein the selection parameters comprise at least one of a message urgency, a message cost, a message protocol type, a message service type, a destination device capability, or a time of day.

46. An apparatus as defined in claim 44, wherein the selection parameters comprise at least one of a threshold limit or a threshold range.

47. An apparatus as defined in claim 40, wherein the prioritizer comprises a process designer to at least one of create the prioritization profile, modify the prioritization profile, or delete the prioritization profile.

48. An apparatus as defined in claim 47, further comprising a graphical user interface to access the process designer.

49. A method as defined in claim 19, further comprising dynamically updating an order of the ranked list based on a change in the current call parameter value.

50. A method as defined in claim 19, further comprising:
   retrieving an update of the current call parameter value, the current call parameter value being indicative of a cost to use at least one of the plurality of non-session initiation protocol uniform resource identifiers or non-telephone number uniform resource identifiers; and
   reordering the ranked list of the plurality of non-session initiation protocol uniform resource identifiers or non-telephone number uniform resource identifiers based on the updated current call parameter value.

* * * * *